United States Patent
Glickman et al.

(10) Patent No.: US 10,479,296 B2
(45) Date of Patent: Nov. 19, 2019

(54) SMART GRILLE ASSEMBLY AND MODULAR GRILLE ASSEMBLY SYSTEM FOR A MOTOR VEHICLE

(71) Applicant: FORD GLOBAL TECHNOLOGIES, LLC, Dearborn, MI (US)

(72) Inventors: David Brian Glickman, Southfield, MI (US); Mohan Kamath, West Bloomfield, MI (US); Stuart C. Salter, White Lake, MI (US); Paul Kenneth Dellock, Northville, MI (US); Harry Lobo, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 74 days.

(21) Appl. No.: 15/910,514

(22) Filed: Mar. 2, 2018

(65) Prior Publication Data

US 2019/0270416 A1   Sep. 5, 2019

(51) Int. Cl.
| | | |
|---|---|---|
| B60N 99/00 | (2006.01) | |
| B60R 16/023 | (2006.01) | |
| B62D 65/16 | (2006.01) | |
| B62D 25/08 | (2006.01) | |

(52) U.S. Cl.
CPC .......... *B60R 16/023* (2013.01); *B62D 25/085* (2013.01); *B62D 65/16* (2013.01)

(58) Field of Classification Search
CPC ...... B60R 16/023; B62D 25/085; B62D 65/16
See application file for complete search history.

(56) References Cited

U.S. PATENT DOCUMENTS

| | | | |
|---|---|---|---|
| 4,354,566 A | 10/1982 | Yuda | |
| 4,645,250 A | 2/1987 | Bauer et al. | |
| 5,373,426 A * | 12/1994 | O'Sullivan | B60Q 1/442 340/467 |
| 7,163,321 B2 | 1/2007 | Contarino | |
| 7,464,984 B1 | 12/2008 | McDaniel | |
| 7,481,487 B2 | 1/2009 | Lau et al. | |
| 8,038,204 B1 | 10/2011 | Baker | |
| 8,911,005 B2 * | 12/2014 | Townson | B62D 25/085 29/466 |
| 8,960,734 B2 | 2/2015 | Camp | |
| 8,979,180 B2 * | 3/2015 | Townson | B62D 25/085 296/193.09 |
| 9,321,495 B2 * | 4/2016 | Townson | B62D 65/02 |
| 9,586,624 B2 * | 3/2017 | Riedl | B62D 25/082 |
| 10,040,344 B2 * | 8/2018 | Schoning | B60R 19/48 |
| 2002/0084122 A1 * | 7/2002 | Emori | B29C 45/14065 180/68.4 |
| 2005/0006928 A1 * | 1/2005 | Diehl | B60R 19/52 296/193.1 |
| 2014/0062140 A1 * | 3/2014 | Townson | B62D 25/085 296/193.09 |

(Continued)

*Primary Examiner* — Lori L Lyjak
(74) *Attorney, Agent, or Firm* — Jason Rogers; Vichit Chea; King & Schickli, PLLC

(57) ABSTRACT

A grille assembly for a motor vehicle includes a grille support mounted to the motor vehicle and a grille module carried on the grille support. The grille module includes a grille, and a plurality of electronic devices and a controller carried on the grille. A related modular grille assembly system includes the grille assembly as well as human interface controls and a control module carried on the motor vehicle.

20 Claims, 8 Drawing Sheets

(56) References Cited

U.S. PATENT DOCUMENTS

| | | | |
|---|---|---|---|
| 2015/0152665 A1 | 6/2015 | Camp | |
| 2015/0274211 A1* | 10/2015 | Riedl | B62D 25/084 296/187.09 |
| 2016/0052559 A1* | 2/2016 | Schmidt | B60K 11/08 296/193.1 |
| 2019/0039538 A1* | 2/2019 | Grgac | B62D 21/17 |

* cited by examiner

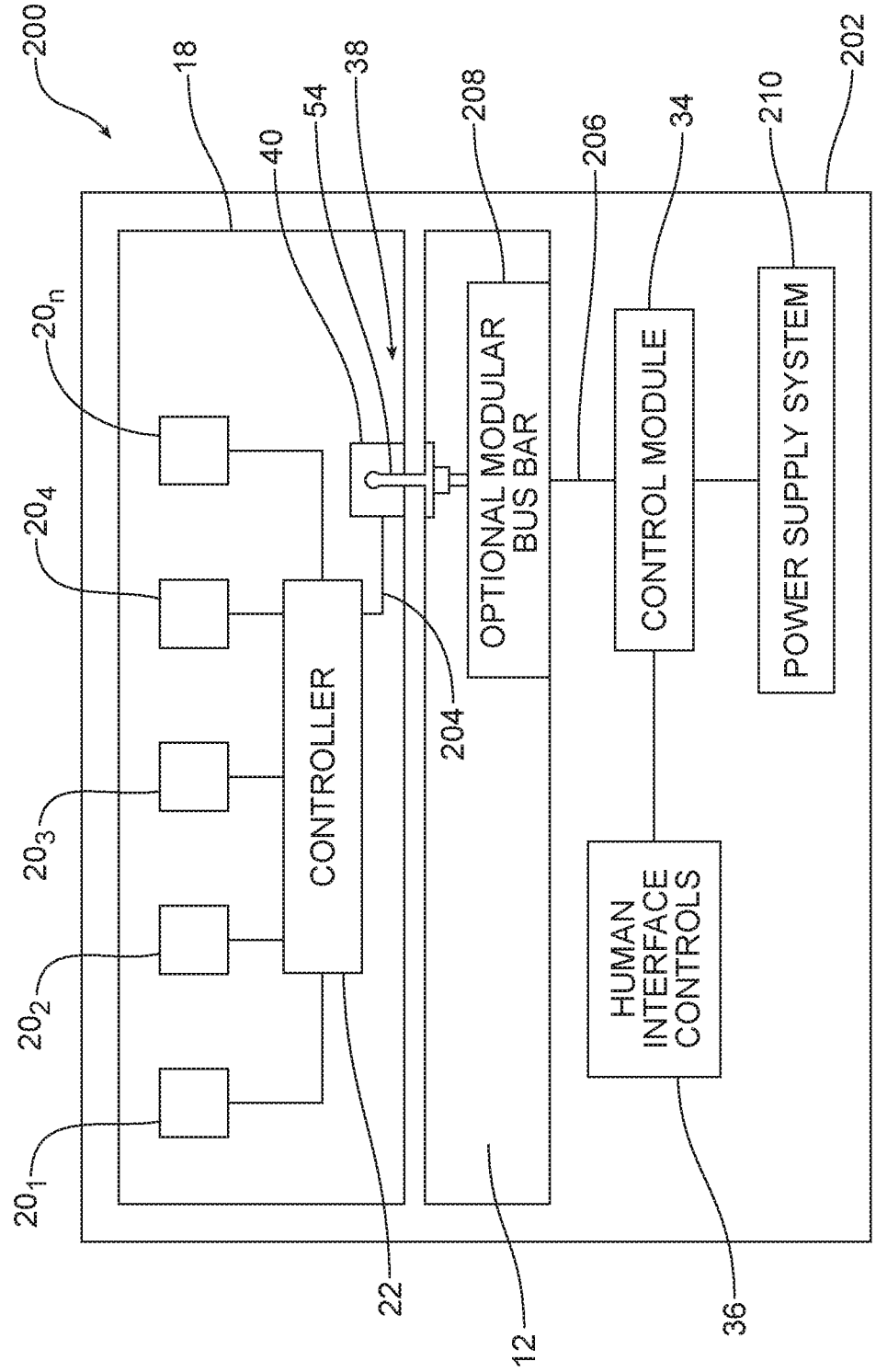

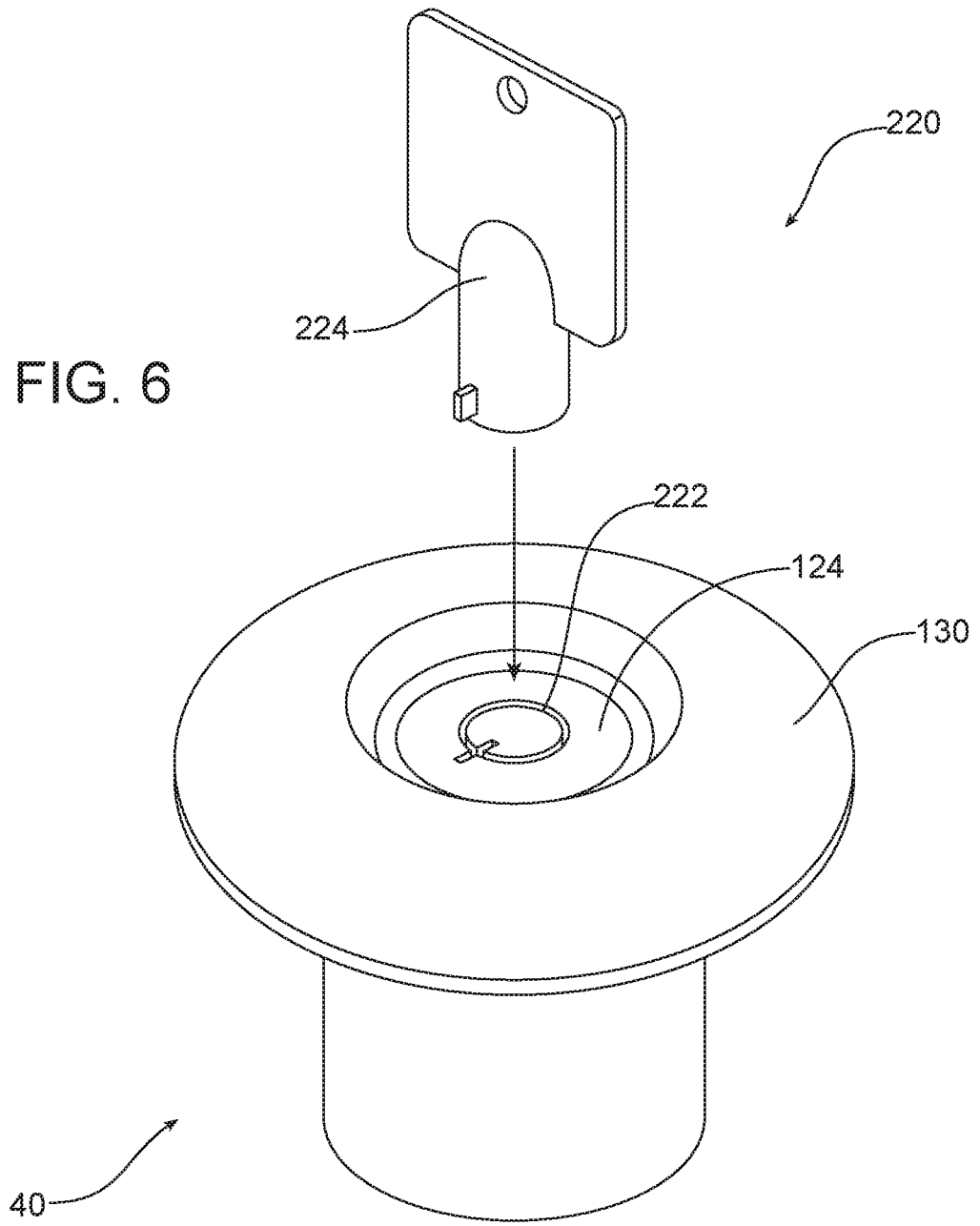

SMART GRILLE ASSEMBLY AND MODULAR GRILLE ASSEMBLY SYSTEM FOR A MOTOR VEHICLE

TECHNICAL FIELD

This document relates generally to the motor vehicle equipment field and, more particularly, to a smart grille assembly and a modular grille assembly system for a motor vehicle as well as to a related method of configuring human interface controls of the motor vehicle for operating a plurality of electronic devices carried on a particular grille assembly.

BACKGROUND

This document relates to a new and improved grille assembly as well as to a new and improved modular grille assembly system for a motor vehicle. Advantageously, the grille assembly is a "smart" grille assembly that incorporates a controller configured to communicate information respecting a plurality of electronic devices carried on the grille over an area network of the motor vehicle.

The modular grille assembly incorporates the grille module as well as a grille support, human interface controls and a control module carried on the motor vehicle. The grille module is carried on the grille support. The controller carried on the grille is configured to communicate information respecting the plurality of electronic devices carried on the grille over an area network of the motor vehicle to the control module. That control module is adapted to configure the human interface controls of the motor vehicle to match the plurality of electronic devices carried on the grille module.

Additionally, a new and improved method is provided for configuring human interface controls of a motor vehicle for operating a plurality of electronic devices carried on a particular grille module.

The grille assembly, modular grille assembly system and related method allow a motor vehicle owner to customize the front grille module with a number of desired electronic accessories and automatically adjusts the human interface controls of the motor vehicle for operation of those electronic accessories in a most convenient and efficient manner.

SUMMARY

A new and improved grille assembly is provided for a motor vehicle. That grille assembly comprises a grille support, mounted to the motor vehicle, and a grille module carried on the grille support. The grille module includes a grille as well as a plurality of electronic devices and a controller carried on the grille. The controller is configured to communicate information respecting the plurality of electronic devices carried on the grille over an area network of the motor vehicle.

The grille assembly may further include a stud carried on the grille support and a latch mechanism carried on the grille whereby the grille may be secure to the grille support. The stud may include a power pathway and an electrical ground pathway to the grille. The stud may include an area network communication pathway to the controller carried on the grille.

Further, the grille assembly may include integral wiring carried on the grille and extending from the plurality of electronic devices toward the power pathway, the ground pathway and the area network communication pathway of the stud.

In one or more embodiments of the grille assembly, an active grille shutter may be carried on the grille support. Further, in one or more embodiments of the grille assembly a modular bus bar may be carried on the grille support.

The plurality of electronic devices carried on the grille support may be selected from, but are not necessarily limited to, the group of electronic devices consisting of an integrated light bar, a power point, a spotlight, an illuminated badge, a heater, a winch, turn signals, an active grille shutter, a brush bar with integral lighting, a camera, an emergency vehicle light system, an emergency vehicle communication sensor for traffic light control, a lighted integrated step and combinations thereof.

In accordance with an additional aspect, a new and improved modular grille assembly system is provided for a motor vehicle. That modular grille assembly system comprises a grille support mounted to the motor vehicle, a grille carried on the grille support, a plurality of electronic devices carried on the grille and a controller carried on the grille. In addition, the modular grille assembly system further includes human interface controls and a control module both carried on the motor vehicle.

The controller carried on the grille is configured to communicate information respecting the plurality of electronic devices carried on the grille over an area network of the motor vehicle to the control module. The modular grille assembly system is further characterized by the control module being adapted to configure the human interface controls for convenient and effective operation of the plurality of electronic devices carried on the grille.

The modular grille assembly system may further include a stud carried on the grille support and a latch mechanism carried on the grille whereby the grille may be secured to the grille support. The stud may include a power pathway and an electrical ground pathway to the grille. The stud may alternatively or also include an area network communication pathway to the controller on the grille.

The modular grille assembly system may further include integral wiring carried on the grille and extending from the plurality of electronic devices toward the power pathway, the ground pathway and the area network communication pathway of the stud.

In accordance with an additional aspect, a method is provided for configuring human interface controls of a motor vehicle for operating a plurality of electronic devices carried on a particular grille module. That method may be broadly described as comprising the steps of: (a) selecting a grille from a plurality of different grilles, (b) mounting the selected grille onto a grille support of the motor vehicle, (c) configuring, by a controller carried on the selected grille, information respecting the plurality of electronic devices to a control module on the motor vehicle and (d) configuring, by the control module, the human interface controls for operating the plurality of electronic devices carried on the grille.

The method may further include the step of connecting a stud on one of the grille support and the grille with a latch mechanism on the other of the grille support and the grille. In addition, the method may include the step of completing a power pathway from the motor vehicle to the plurality of electronic devices upon connecting the stud to the latch mechanism.

Still further, the method may include the step of completing an electronic ground pathway from the plurality of electronic devices to the motor vehicle upon connecting the stud with the latch mechanism. The method may also include the step of completing an area network communication pathway from the controller on the grille to the control module of the motor vehicle upon connecting the stud with the latch mechanism.

Still further, the method may include the step of disconnecting the grille from the grille support and mounting a second grille on the grille support. Still further, the method may include the steps of: (a) communicating, by a second controller carried on the second grille, information respecting a second plurality of electronic devices carried on the second grille and (b) reconfiguring, by the control module, the human interface controls for operating the second plurality of electronic devices.

In the following description, there are shown and described several preferred embodiments of the grille assembly, modular grille assembly system and related method of configuring human interface controls of a motor vehicle for operating a plurality of electronic devices carried on a particular grille module. As it should be realized, the grille assembly, modular grille assembly system and related method are capable of other, different embodiments and their several details are capable of modification in various, obvious aspects all without departing from the grille assembly, modular grille assembly system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the grille assembly, modular grille assembly system and method and together with the description serve to explain certain principles thereof.

FIG. 5 is a schematic block diagram of the modular grille assembly system.

FIG. 6 is a perspective view illustrating an alternative embodiment wherein the latch mechanism of the latch assembly incorporates a locking feature including a key receiver and a key configured for receipt in the key receiver.

Reference will now be made in detail to the present preferred embodiments of the grille assembly and modular grille assembly system, examples of which are illustrated in the accompanying drawing figures.

DETAILED DESCRIPTION

Figure 1:
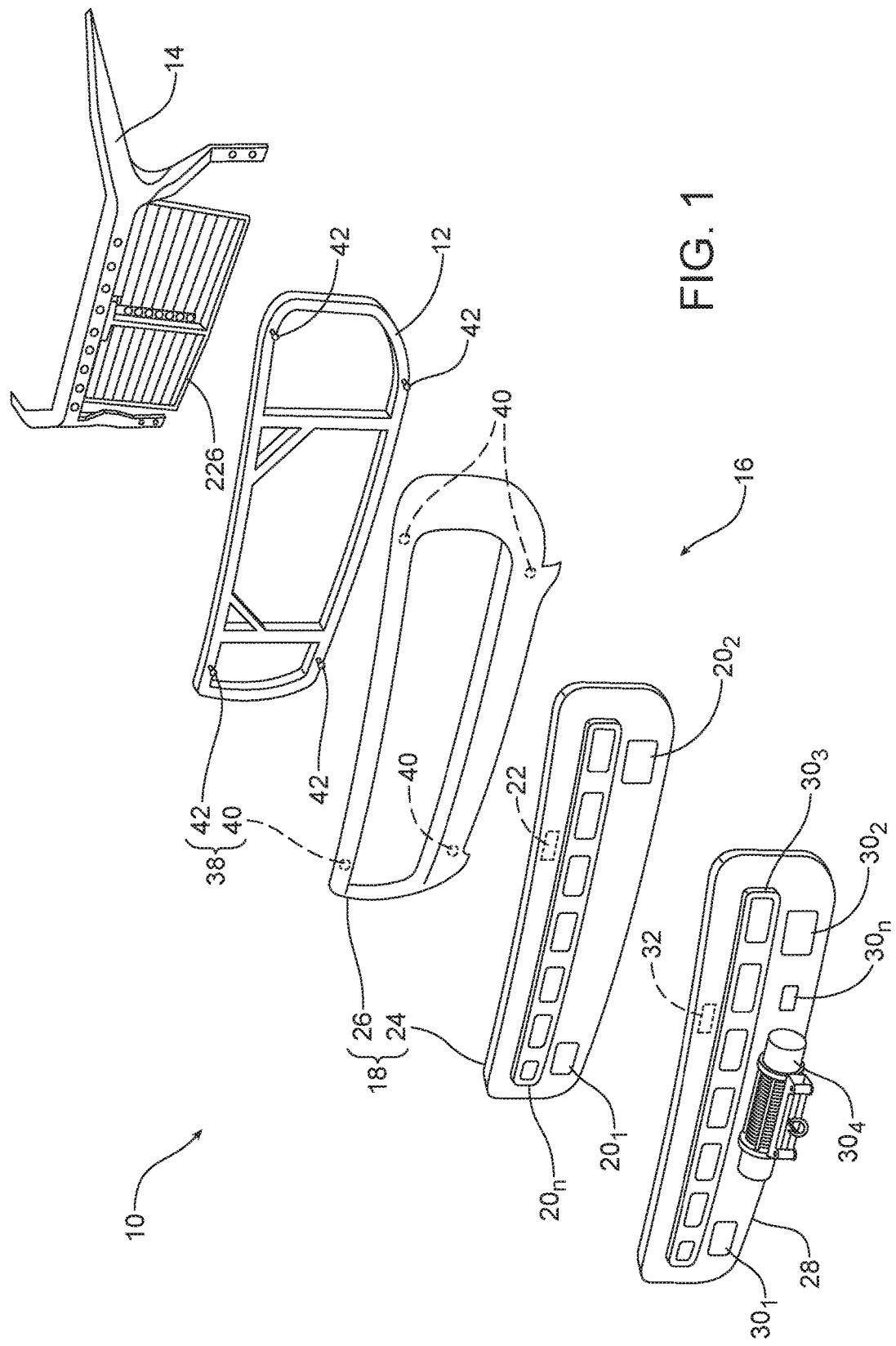
FIG. 1 is an exploded perspective view of the grille assembly and modular grille assembly system.

Reference is now made to FIG. 1 illustrating a grille assembly 10 for a motor vehicle. The grille assembly 10 includes a grille support 12 that may be fixed to the front bolster 14 forming a part of the superstructure of the motor vehicle. A grille module 16 is carried on the grille support 12. The grille module 16 includes a two-part grille 18, a plurality of electronic devices $20_1$-$20_n$ and a controller 22 carried on the grille. The controller 22 provides a smart function to the grille described in greater detail below.

The electronic devices $20_1$-$20_n$ may include substantially any electronic device that is useful when mounted to a grille 18 at the front end of the motor vehicle. Such electronic devices $20_1$-$20_n$ or $30_1$-$30_n$ include, but are not necessarily limited to, a group consisting of an integrated light bar, a power point, a spotlight, an illuminated badge, a heater, a winch, turn signals, an active grille shutter, a brush bar with integral lighting, a camera, an emergency vehicle light system, an emergency vehicle communication sensor for traffic light control, a lighted integrated step and combinations thereof.

The controller 22 may comprise a computing device such as a dedicated microprocessor or an electronic control unit (ECU) operating in accordance with instructions from appropriate control software. Thus, the controller 22 may comprise one or more processors, one or more memories and one or more network interfaces all in communication with each other over one or more communication buses.

The two-part grille 18 includes an insert 24 and a decorative border 26 received around the insert 24. FIG. 1 also discloses a second insert 28 including a second plurality of electronic devices $30_1$-$30_n$ and a second controller 32. As will be described in greater detail below, either grille insert 24, 28 may be secured to the front bolster 14 of the motor vehicle. Thus, a motor vehicle owner may customize the motor vehicle and, more particularly, electronic devices $20_1$-$20_n$ or $30_1$-$30_n$ provided on the grille 18 as desired.

The controller 22 carried on the insert 24 of the grille 18 is configured to communicate information respecting the first plurality of electronic devices $20_1$-$20_n$ carried on the insert 24 over an area network of the motor vehicle in a manner described in greater detail below. Similarly, the second controller 32 on the second insert 28 of the grille 18 is configured to communicate information respecting the second plurality of electronic devices $30_1$-$30_n$ carried on the second insert over the area network of the motor vehicle.

As further described below, a motor vehicle owner may select a particular grille 18 or particular grille insert 24, 28 incorporating a particular set of electronic devices $20_1$-$20_n$ or $30_1$-$30_n$ for mounting to the motor vehicle and the controller 22 or 32 associated with the selected grille or grille insert communicates information with respect to the devices provided on the selected grille or grille insert over an area network of the motor vehicle to a control module 34 associated with the motor vehicle. That control module 34 may comprise, for example, a body control module (BCM) or powertrain control module (PCM). The control module 34 is adapted to configure the human interface controls 36 of the motor vehicle for operating the plurality of electronic devices $20_1$-$20_n$ or $30_1$-$30_n$ provided on the particular grille 18 or grille insert 24 or 28 selected by the owner and mounted to the motor vehicle in a manner described in greater detail below.

A latch assembly, generally designated by reference numeral 38 secures the grille 18 to the grille support 12. In the illustrated embodiment, the latch assembly 38 comprises a latch mechanism 40 carried on the grille 18 and a locking pin or stud 42 carried on the grille support 12.

Figure 2A:
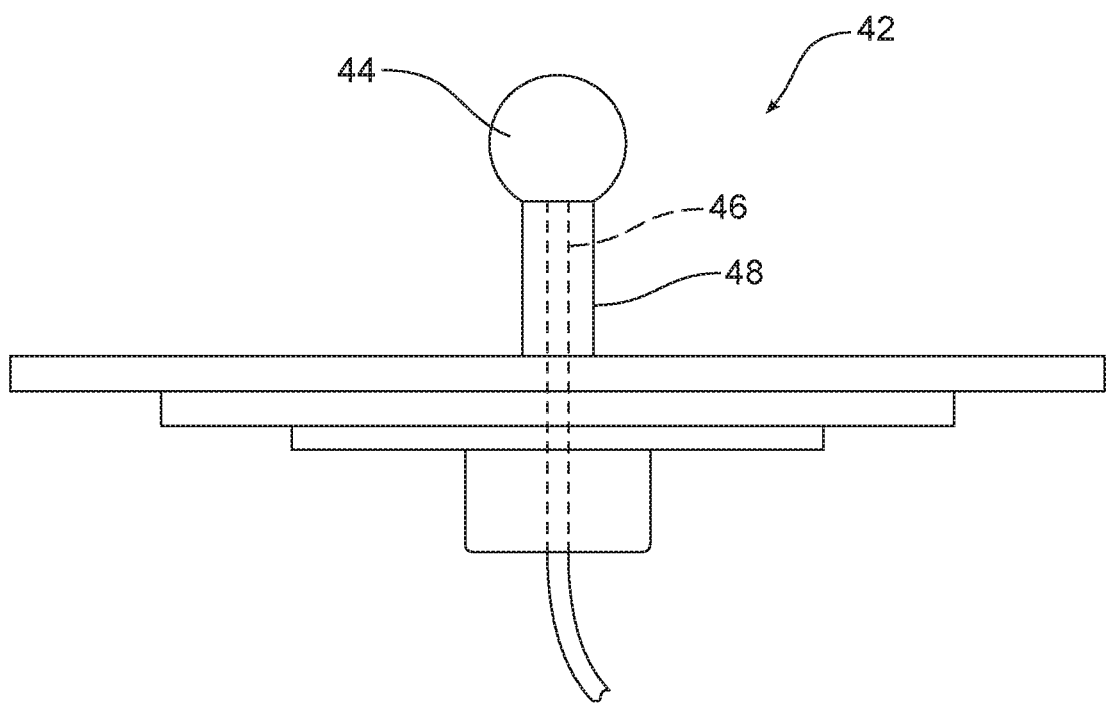
FIG. 2a is detailed schematic view of a first embodiment of a mounting stud utilized to secure the grille module to the grille support wherein that stud incorporates a power pathway and an electrical ground pathway to the grille.

As illustrated in FIG. 2a, the stud 42 may include a simple ball contact 44 and associated structure providing an isolated power pathway 46 from the motor vehicle to the grille 18 and the electronic devices $20_1$-$20_n$ or $30_1$-$30_n$ carried through the metal components of mating latch mechanism 40. In the embodiment illustrated in FIG. 2a, the base 48 provides an electrical ground pathway for the same purpose. The stud 42 illustrated in FIG. 2a is of the ball contact type.

Figure 2B:
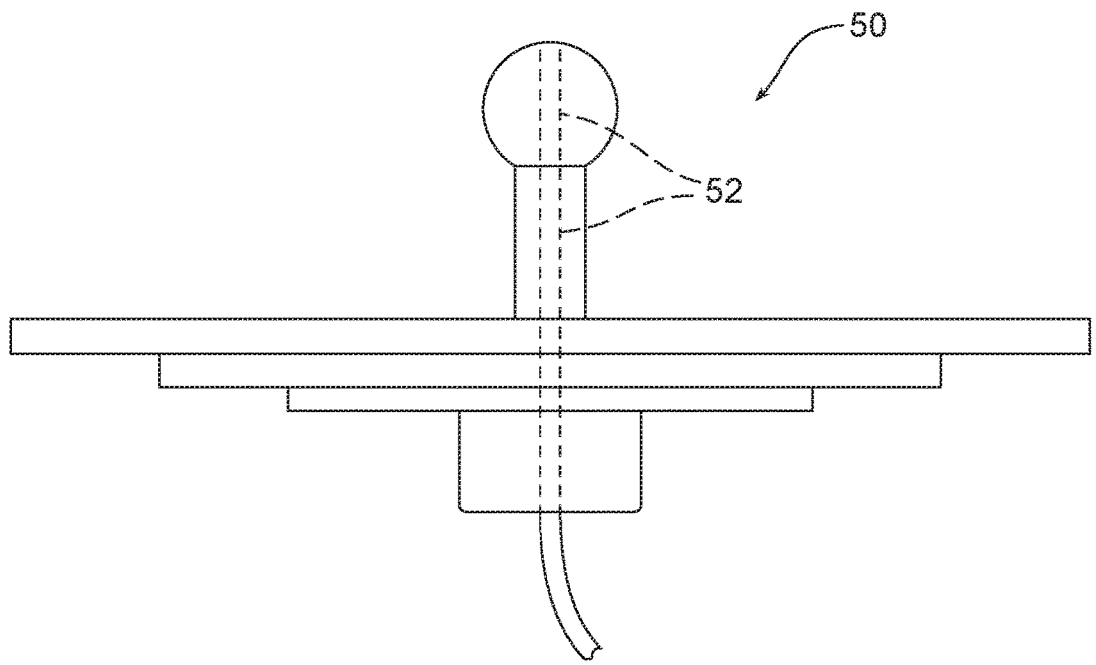
FIG. 2b is a view similar to FIG. 2a but illustrating an alternative embodiment of the stud wherein the stud incorporates an area network communication pathway to the grille.

FIG. 2b illustrates an alternative embodiment of stud 50 that incorporates an area network communication pathway 52 that connects the controller 22 or 32 on the grille 18 with the control module 34 of the motor vehicle. The stud 50, illustrated in FIG. 2b, is of the overmolded plastic, press fit or powdered metal type.

Figure 2C:
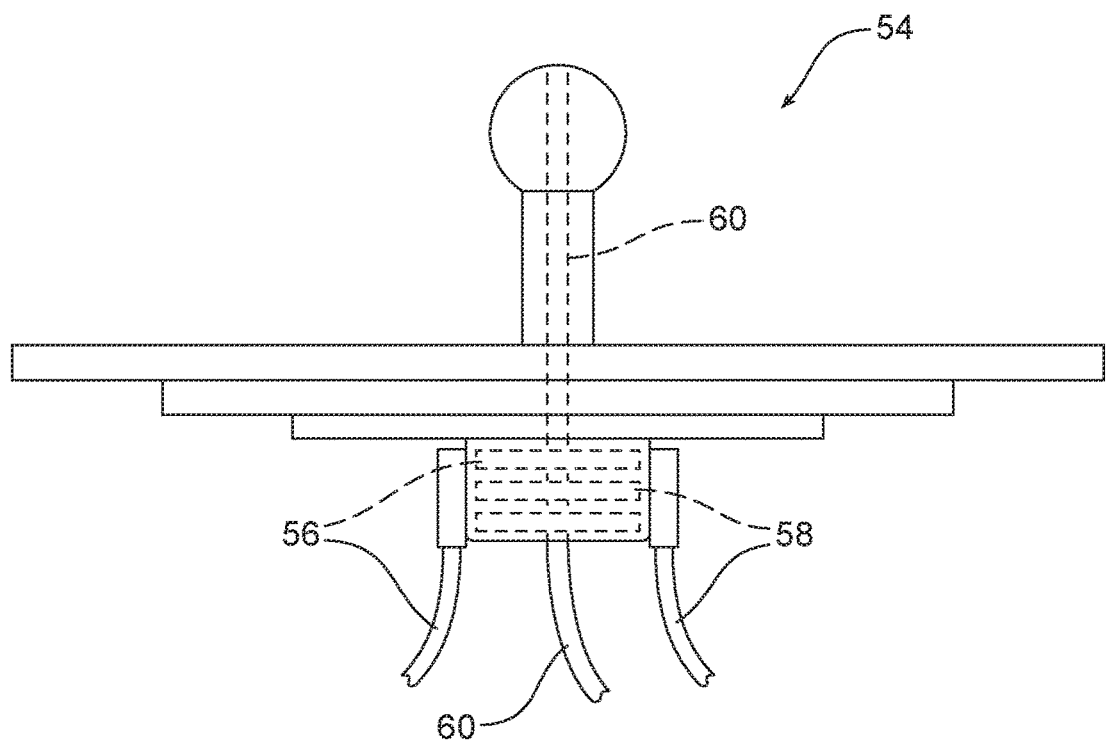
FIG. 2c is a view similar to FIGS. 2a and 2b but illustrating a third possible embodiment of stud incorporating a power pathway, an electrical ground pathway and an area network communication pathway to the grille.

FIG. 2c illustrates yet another alternative embodiment of stud 54 which includes a power pathway 56, a ground pathway 58 and an area network communication pathway 60. The stud 50, illustrated in FIG. 2c, is of the screw contact type.

As should be appreciated, a plurality of latch assemblies 38 may be provided to connect the grille 18 to the grille support 12 carried on the front bolster 14 of a motor vehicle. Any one of the studs 42, 50, 54 of those latch assemblies 38 may include 0, 1, 2 or 3 of the pathways including the power pathway, the ground pathway and the area network communication pathway.

Figure 3:
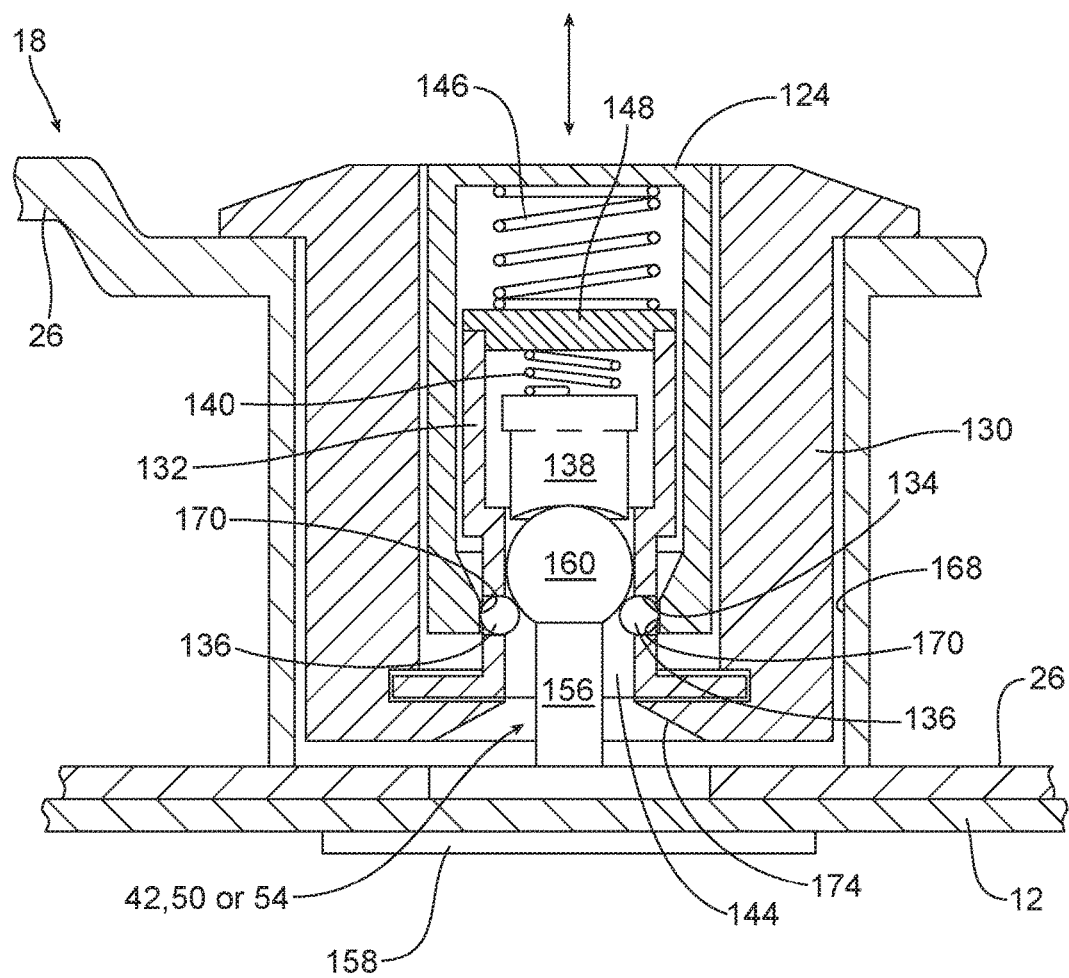
FIG. 3 is a detailed cross-sectional view illustrating the latch mechanism and stud of the latch assembly in an unlatched configuration.
Figure 4:
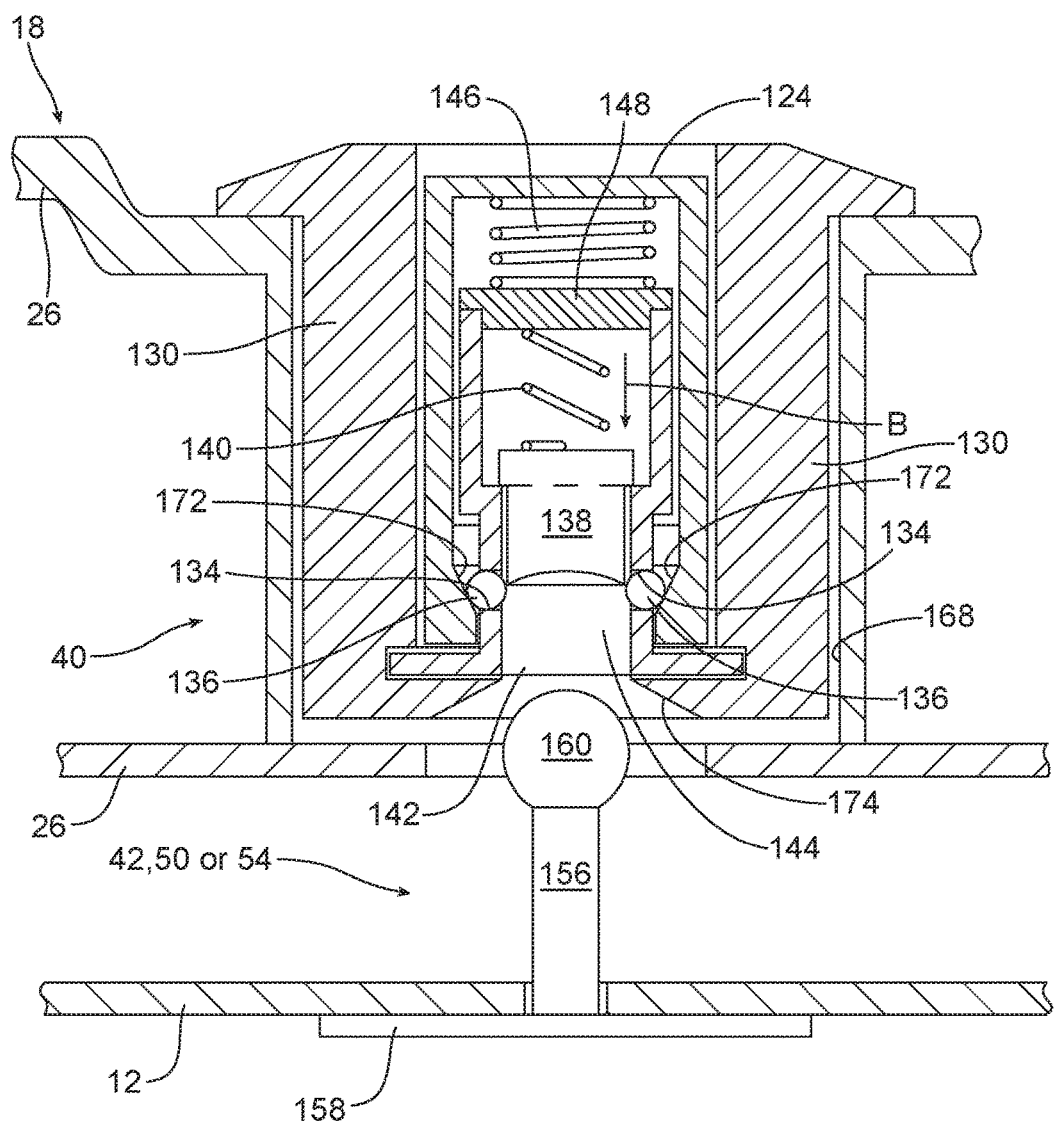
FIG. 4 is a perspective view similar to FIG. 3 but illustrating the latch assembly in a latched configuration.

Reference is now made to FIGS. 3 and 4 which are detailed cross-sectional views illustrating one possible embodiment of the latch mechanism 40 in the respective latched and unlatched configurations.

As illustrated, each latch mechanism 40 includes an outer housing 130 that receives the push button actuator 124 and an inner housing 132 received within the push button actuator. A plurality of apertures 134 are aligned and radially arrayed around the inner housing 132. A plurality of retaining balls 136 are freely received in the plurality of apertures 134.

A locking plunger 138 is received in the inner housing 132. A locking plunger spring 140 biases the locking plunger 138 toward the entry opening 142 of a locking pin receiver 144 in the inner housing 132. A return spring 146 extends between the push button actuator and the cap 148 of the inner housing 132. As will be appreciated from the following description, the return spring 146 functions to bias the push button actuator 124 toward a home position that is illustrated in drawing FIG. 3.

At least one well 168 is provided in the border 26 of the grille 18. Each well 168 is sized and shaped to receive and hold the outer housing 130 of one latch mechanism 40. As illustrated, each stud 42, 50, 54 includes a shank 156 having a base and mounting flange 158 at a proximal end and an enlarged head 160 at a distal end. The mounting flange 158 is fixed to the grille support 12 by welding, a fastener or any other appropriate means.

In the illustrated embodiment, four latch assemblies 38 connect the grille 18 to the grille support 12. More specifically, the projecting and enlarged head 160 of each stud 42, 50, 54 is received in the locking pin receiver 144 of each latch mechanism 40. The enlarged head 160 is engaged against the locking plunger 138 and captured in the locking pin receiver 144 between the locking plunger 138 and the retaining balls 136 which are held in a position projecting inward against the enlarged head 160 by the bearing surface 170 of the push button actuator 124.

When one wishes to release the grille 18 and detach the grille from the grille support 12, one must press the push button actuator 124 of each latch mechanism 40. FIG. 4 illustrates the push button actuator 124 in the depressed position. In this position, the sloped cam surface 172 along the inner wall of the push button actuator 124 is aligned with the retaining balls 136 and the apertures 134. This creates clearance for the outward movement of the retaining balls 136 into the apertures 134 as the locking plunger spring 140 biases the locking plunger 138 in the direction of action arrow B. As the locking pin is withdrawn from the latching mechanism 40 in the direction of action arrow B, the retaining balls 136 are pushed radially outward providing clearance for the enlarged head 160 of the stud 42, 50, 54 to pass out of the locking pin receiver 144 thereby freeing the grille 18 from the grille support 12. Upon release, the push button actuator 124 is returned to the home position illustrated in FIG. 3 by operation of the return spring 146.

When one wishes to again fix the grille 18 (the same one or a different one) to the grille support 12, one aligns the grille so that each locking pin receiver 144 of each latch mechanism 40 is aligned with each cooperating stud 42, 50, 54 fixed to the grille support. The tapered entry 174 provided in the outer housing 130 that converges toward the locking pin receiver 144 aids in the proper aligning of the grille with the grille support. Once aligned, one pushes the grille 18 toward the grille support 12 to gently force the enlarged head 160 of each stud 42, 50, 54 against the force of the locking plunger spring 140 of each latch mechanism 40 until the enlarged head 160 snap past the retaining balls 136 and are again locked in position.

As illustrated in FIG. 6, one or more of the latch mechanisms 40 that secure the grille 18 in position may include a locking feature 176 to prevent theft. As illustrated in FIG. 5, that locking feature 176 may include a key receiver 178 integrated into the push button actuator 124 and a cooperating key 180 configured for receiving and unlocking of the locking feature 176. When the locking feature 176 is locked, the push button actuator 124 is secured in the home position with the retaining balls 136 biased radially inward to securely hold the enlarged head 160 of the stud 42, 50, 54 in the locking pin receiver 144 of the latch mechanism 40 thereby preventing theft of the grille 18. Such a push button locking feature 176 is known in the art.

Reference is now made to FIG. 5 illustrating the new and improved modular grille assembly system 200 for a motor vehicle. The illustrated modular grille assembly system 200 includes a grille module 16 such as described above and illustrated in FIG. 1. That grille module 16 includes the grille 18, the plurality of electronic devices $20_1$-$20_n$ and the dedicated controller 22 carried on the grille. The grille 18 is connected to the grille support 12 of the motor vehicle 202 by the latch assembly 38 including the latch mechanism 40 carried on the grille 18 and the stud 54 carried on the grille support 12. Integral wiring 204 carried on the grille 18 extends from the plurality of electronic devices $20_1$-$20_n$ through the controller 22 toward the power pathway 56, the ground pathway 58 and the area network communication pathway 60 of the stud 54. (See also FIG. 2c).

The area network communication pathway 60 through the stud 54 is connected to the area network 206 of the motor vehicle 202. If desired, the communication pathway may also incorporate an optional modular bus bar 208 that may be provided on the grille support 12.

As noted above, the controller 22 on the grille 18 is configured to communicate information respecting the plurality of electronic devices $20_1$-$20_n$ carried on the grille over the area network 206 of the motor vehicle 202 to the control module 34 of the motor vehicle. That control module 34 is adapted to configure the human interface controls 36 of the motor vehicle 202 for convenient and efficient operation of whatever plurality of electronic devices $20_1$-$20_n$ are provided on the grille 18 that is connected to the motor vehicle. Power, ground and communication signals pass through the latch assembly 38 by means of the power pathway 56, ground pathway 58 and area network communication pathway 60 provided in the stud 54. Those human interface controls 36 may comprise, for example, dedicated switches such as toggle switches, push buttons and the like, touchscreen controls such as may be provided on a center console of the motor vehicle or any other appropriate means.

The modular grille assembly system 200 illustrated in FIG. 5 including the grille assembly 10 such as illustrated in FIG. 1, is adapted for use in a method of configuring the human interface controls 36 of the motor vehicle 202 for operating the plurality of electronic devices $20_1$-$20_n$ carried on the grille 18. That method includes the step of selecting the grille 18 from a plurality of different grilles which may be connected to the motor vehicle. Further, the method includes mounting the selected grille 18 onto the grille support 12 of the motor vehicle 202. The method also includes the step of communicating, by the controller 22 carried on the selected grille 18, information respecting the plurality of electronic devices $20_1$-$20_n$ provided on the grille 18 to the control module 34 of the motor vehicle 202 to which the grille 18 is connected. The method then includes the step of configuring, by the control module 34, the human interface controls 36 of the motor vehicle 202 for operating the plurality of electronic devices $20_1$-$20_n$ provided on the grille 18. This is done automatically when latch mechanism 40 on the grille 18 is properly seated, connected and locked to the stud 54 carried on the grille support 12. More specifically, that connection completes the power pathway 56, ground pathway 58 and area network communication pathway 60 between (a) the controller 22 and the electronic devices $20_1$-$20_n$ carried on the grille 18 with (b) the control module 34 and the power supply system 210 carried on the motor vehicle.

As should be further appreciated, the owner of the motor vehicle 202 may at any time customize the motor vehicle 202 by selecting an alternative grille 18 or alternative or second grille insert 28 as illustrated in FIG. 1. Thus, the method may include the step of disconnecting the grille 18 from the grill support 12 and mounting a second grille with a second, different grille insert 28 and a second set of different electronic devices $30_1$-$30_n$ to the grille support 12. In this situation, the method includes the additional steps of (a) communicating, by the second controller 32 carried on the second grille/second grille insert 28, information respecting the second plurality of electronic devices $30_1$-$30_n$ carried on the second grille and (b) reconfiguring, by the control module 34, the human interface controls 36 for operating the second plurality of electronic devices in a convenient and efficient manner.

In summary, the new and improved grille assembly 10 and the new and improved modular grille assembly system 200 provide a number of benefits and advantages allowing a motor vehicle owner to simply and easily customize the motor vehicle by selecting a grille with any desired set of electronic devices. The push button latch mechanism 40 allows for easy removal and reattachment of grilles. Each latch mechanism 40 has concentric ball bearings which apply the necessary retention force required to hold the grille 18 in place. The locking pin or stud 42, 50, 54 of the latch assembly 38 may include any necessary power, ground and area network communication pathways to provide the necessary power connection and control information connection between the controller 22, 32 on the grille and the control module 34 of the motor vehicle. This ensures that the plurality of electronic devices $20_1$-$20_n$ or $30_1$-$30_n$ provided on the selected grille 18 may be activated as needed through configuring of the human interface controls 36 of the motor vehicle to match the electronic devices provided on the grille.

The foregoing has been presented for purposes of illustration and description. It is not intended to be exhaustive or to limit the embodiments to the precise form disclosed. Obvious modifications and variations are possible in light of the above teachings. For example, as illustrated in FIG. 6, the latch mechanism 40 may incorporate a locking feature 220 of a type known in the art. In the illustrated embodiment, that locking feature 220 comprises a key receiver 222 integrated into the push button of the latch mechanism 40 and a cooperating key 224 especially adapted for receiving the key receiver. When the locking feature 220 is locked, the push button cannot be depressed to release the latch assembly 38. However, when the key 224 is inserted into the key receiver 222 and twisted to unlock the locking feature 220, the push button may be depressed to release the latch assembly 38 and allow removal of the grille from the motor vehicle. Thus, the locking feature 220 provides theft protection for the grille.

As illustrated in FIG. 1, an active grille shutter 226 is mounted to or carried on the front bolster 14 of the motor vehicle 202. In other embodiments, the active grille shutter 226 may be mounted to or carried on the grille support 12 or even the grille module 16 attached to the grille support. All such modifications and variations are within the scope of the appended claims when interpreted in accordance with the breadth to which they are fairly, legally and equitably entitled.

What is claimed:

1. A grille assembly for a motor vehicle, comprising:
a grille support mounted to said motor vehicle;
a grille module carried on said grille support, said grille module including a grille, a plurality of electronic devices carried on said grill and a controller carried on said grille and configured to communicate information respecting said plurality of electronic devices carried on said grille over an area network of said motor vehicle.

2. The grille assembly of claim 1, further including a stud carried on said grille support and a latch mechanism carried on said grille whereby said grille is secured to said grille support.

3. The grille assembly of claim 2 wherein said stud includes a power pathway and an electrical ground pathway to said grille.

4. The grille assembly of claim 3 wherein said stud includes an area network communication pathway to said grille.

5. The grille assembly of claim 4 including integral wiring carried on said grille and extending from said plurality of electronic devices toward said power pathway, said electrical ground pathway and said area network communication pathway of said stud.

6. The grille assembly of claim 2, further including an active grille shutter carried on said grille support.

7. The grille assembly of claim 1, further including a modular bus bar carried on said grille support.

8. The grille assembly of claim 2, wherein said plurality of electronic devices are selected from a group consisting of an integrated light bar, a power point, a spotlight, an illuminated badge, a heater, a winch, turn signals, an active grille shutter, a brush bar with integral lighting, camera, an emergency vehicle light system, an emergency vehicle communication sensor for traffic light control, a lighted integrated step and combinations thereof.

9. A modular grille assembly system for a motor vehicle, comprising:
- a grille support mounted to said motor vehicle;
- a grille carried on said grille support;
- a plurality of electronic devices carried on said grille;
- human interface controls carried on said motor vehicle;
- a control module carried on said motor vehicle; and
- a controller carried on said grille and configured to communicate information respecting said plurality of electronic devices carried on said grille over an area network of said motor vehicle to said control module, said modular grille assembly system being further characterized by said control module being adapted to configure said human interface controls for said plurality of electronic devices.

10. The modular grille assembly system of claim 9, further including a stud carried on said grille support and a latch mechanism carried on said grille whereby said grille is secured to said grille support.

11. The modular grille assembly system of claim 10, wherein said stud includes a power pathway and an electrical ground pathway to said grille.

12. The modular grille assembly system of claim 11, wherein said stud includes an area network communication pathway to said grille.

13. The modular grille assembly system of claim 12, including integral wiring carried on said grille and extending from said plurality of electronic devices toward said power pathway, said electrical ground pathway and said area network communication pathway of said stud.

14. A method of configuring human interface controls of a motor vehicle for operating a plurality of electronic devices carried on a particular grille module, comprising:
- selecting a grille from a plurality of different grilles;
- mounting the selected grille onto a grille support of the motor vehicle;
- communicating, by a controller carried on said selected grille, information respecting said plurality of electronic devices to a control module on the motor vehicle; and
- configuring, by said control module, said human interface controls for operating said plurality of electronic devices.

15. The method of claim 14, further including connecting a stud on one of said grille support and said grille with a latch mechanism on the other of said grille support and said grille.

16. The method of claim 15, including completing a power pathway from said motor vehicle to said plurality of electronic devices upon connecting said stud with said latch mechanism.

17. The method of claim 16, including completing an electrical ground pathway from said plurality of electronic devices to said motor vehicle upon connecting said stud with said latch mechanism.

18. The method of claim 17, including completing an area network communication pathway from said controller on said grille to said control module on said motor vehicle upon connecting said stud with said latch mechanism.

19. The method of claim 14, including disconnecting said grille from said grille support and mounting a second grille on said grille support.

20. The method of claim 19, further including (a) communicating, by a second controller carried on the second grille, information respecting a second plurality of electronic devices carried on the second grille and (b) reconfiguring, by said control module, said human interface controls for operating said second plurality of electronic devices.

* * * * *